United States Patent [19]

de Vries

[11] 3,978,388
[45] Aug. 31, 1976

[54] CURRENT-SUPPLY ARRANGEMENT FOR AN ELECTRONIC REMOTE CONTROL RECEIVER

[75] Inventor: Hans de Vries, Illnau, Switzerland

[73] Assignee: Zellweger Uster Ltd., Uster, Switzerland

[22] Filed: July 1, 1974

[21] Appl. No.: 484,777

[30] Foreign Application Priority Data
July 13, 1973 Switzerland.................. 10239/73

[52] U.S. Cl..................... 321/10; 317/DIG. 6; 321/11; 323/8; 323/22 Z
[51] Int. Cl.²................. H02M 7/08; G05F 3/14
[58] Field of Search............ 321/10, 11, 14; 323/8, 323/22 Z, 75 F; 317/14 B, 20, DIG. 6, 17, 61.5, 11 C

[56] References Cited
UNITED STATES PATENTS

| | | | |
|---|---|---|---|
| 3,355,650 | 11/1967 | Tolmie | 323/8 |
| 3,377,540 | 4/1968 | Meyer | 321/14 X |
| 3,402,325 | 9/1968 | Minks | 321/14 X |
| 3,408,551 | 10/1968 | Kuba | 321/11 X |
| 3,456,165 | 7/1969 | Hesselgren | 323/75 F |
| 3,671,810 | 6/1972 | Barnes et al. | 317/20 |
| 3,745,416 | 7/1973 | Thanawala | 317/20 |

*Primary Examiner*—Gerald Goldberg
*Attorney, Agent, or Firm*—Werner W. Kleeman

[57] ABSTRACT

A current supply arrangement for an electronic remote control receiver, wherein a series circuit comprising a protective impedance, a capacitor and a full-wave rectifier is connected between two input terminals intended for connection to an alternating current network, a voltage limiter is operatively associated with the full-wave rectifier.

6 Claims, 4 Drawing Figures

CURRENT-SUPPLY ARRANGEMENT FOR AN ELECTRONIC REMOTE CONTROL RECEIVER

BACKGROUND OF THE INVENTION

The present invention relates to a current supply arrangement for an electronic remote or ripple control receiver.

The function of a remote control receiver is to selectively receive and evaluate alternating-current pulses and alternating-current pulse sequences superimposed upon a power supply system by a transmitter at a control center or central station. Accordingly, a remote control receiver generally comprises a selective receiving section which filters out pulse sequences of a certain frequency from the voltages delivered to its input. The selective receiving section is followed by a demodulator, generally in the form of a diode rectifier, which forms a d.c. voltage pulse sequence corresponding to the transmitted alternating-current pulse sequence. This direct-current pulse sequence, also known as the pulse pattern, is then evaluated in known manner by means of a time base and a comparator. The commands expressed by any one of the aforementioned alternating-current pulse sequences or by the direct-current pulse sequences obtained from them can be coded in any one of the known codes. Accordingly, the remote control receiver comprises a decoder associated with the time base. In the decoder, a received remote control command is compared with a remote control command associated with the particular receiver and, when the two remote control commands coincide with one another, a "go" signal is formed, for example in the form of a current pulse by which a switching element, for example in the form of a current pulse switch, is actuated.

Most remote control receivers comprise conventional filters, for example LC-resonant circuits or electro-mechanical resonant combinations, which are directly energized by the received, i.e. non-amplified, signal energy. The energy for the direct-current pulse sequence to be generated also emanates from the signal energy delivered to the receiver. An electro-mechanical switch mechanism operated by a synchronous motor connected to the alternating-current power supply is generally used for the time base. A relay or a controlled silicon rectifier can be used as the storage device for the comparator.

As a result of technical advances in the field of electronic semiconductor components, especially integrated circuits, it is now possible to inexpensively produce, for example, electronic filter arrangements such as, for example, active RC-filters and fully electronic circuits for comparing and evaluating pulse patterns. The only electro-mechanical switching element required is, preferably, a current pulse switch operable by the "go" signal by means of which electrical equipment connected to it can be connected to and disconnected from the power supply system in dependence upon the commands received.

In view of the relatively low d.c. voltages of, for example, 20 volts, and also in view of the fact that the electronic circuit arrangements used impose quite stringent demands upon the stability of the feed voltage delivered to them, it has hitherto been considered necessary to use a current supply arrangement incorporating a transformer and a voltage regulator for supplying current to an electronic remote control receiver. Since, however, very large numbers of remote control receivers are often required, it is important for economic reasons to keep their manufacturing costs as low as possible. A transformer-equipped current-supply arrangement is not only expensive, but is also difficult to install in conventional printed circuits.

SUMMARY OF THE INVENTION

Hence, it is a primary object of the present invention to provide an inexpensive current supply arrangement for an electronic remote control receiver.

According to the invention, there is provided a current supply arrangement for an electronic remote control receiver, wherein a series circuit comprising a protective impedance, a capacitor and a full-wave rectifier is connected between two input terminals intended for connection to an alternating current network, a voltage limiter being associated with the full-wave rectifier.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
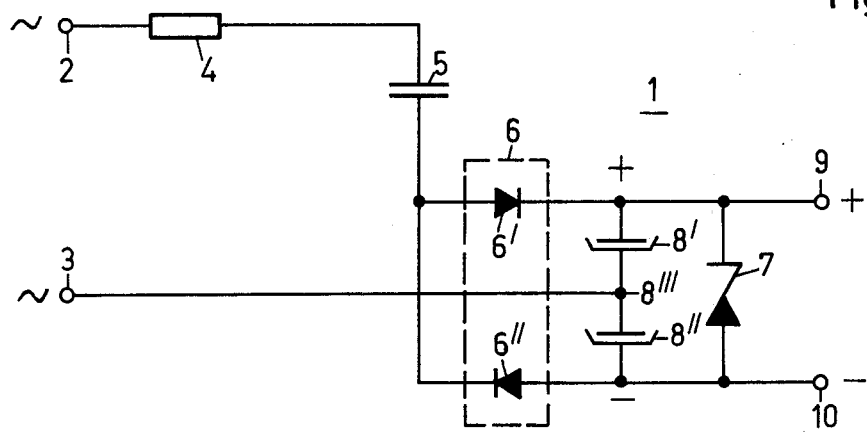
FIG. 1 illustrates a first embodiment with a full-wave rectifier followed by a voltage limiter.

Referring now to the drawing it is to be recognized that throughout the various embodiments the same elements have been generally designated by the same reference characters. FIG. 1 shows a current supply arrangement 1 in which a series circuit comprising a protective impedance 4, a capacitor 5 and a full-wave rectifier 6 is connected between a first input terminal 2 intended for connection to an alternating-current supply and a second such input terminal 3. The full-wave rectifier 6 comprises two oppositely poled diodes 6' and 6", followed by a series connection of two storage capacitors 8' and 8". The point or junction 8''' at which the two storage capacitors 8' and 8" are connected to one another is connected to the other input terminal 3. A voltage limiter 7 is associated with the full-wave rectifier 6. The voltage limiter is in the form of a Zener diode 7 connected in parallel with the d.c. voltage terminals of the full-wave rectifier 6. These d.c. voltage terminals of the full-wave rectifier 6 are connected to the output terminals 9 and 10.

Figure 2:
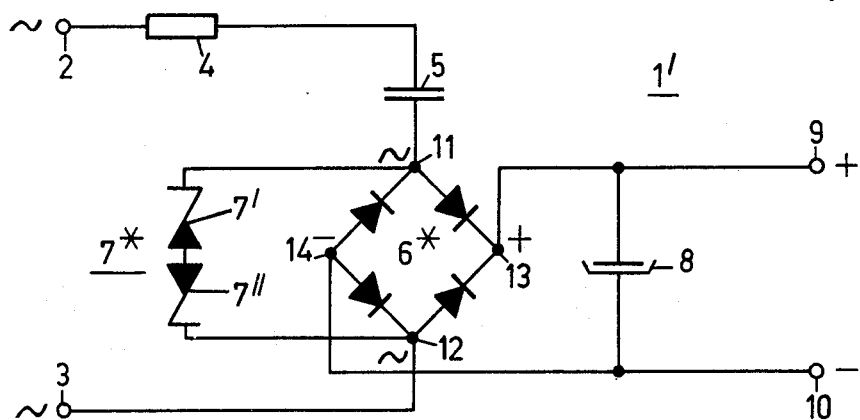
FIG. 2 illustrates a second embodiment with a bridge connected full-wave rectifier and a voltage limiter connected in parallel with the alternating-current terminals of the bridge rectifier.

FIG. 2 shows a current supply arrangement 1' which also embodies a series circuit comprising a protective impedance 4, a capacitor 5 and a full-wave rectifier 6*. In this embodiment, however, the full-wave rectifier 6* is bridge connected. The series circuit leads from the input terminal 2 via the protective impedance 4, the capacitor 5 and the alternating-current terminals 11 and 12 to the other input terminal 3. A voltage limiter 7* is again associated with the full-wave rectifier 6* in the form of two Zener diodes 7' and 7'' arranged in series with opposite polarity, and which diodes are connected to the alternating-current terminals 11 and 12 of the full-wave rectifier 6*. The storage capacitor 8 and the output terminals 9 and 10 are connected to the direct-current terminals 13 and 14 of the full-wave rectifier 6*.

Figure 3:
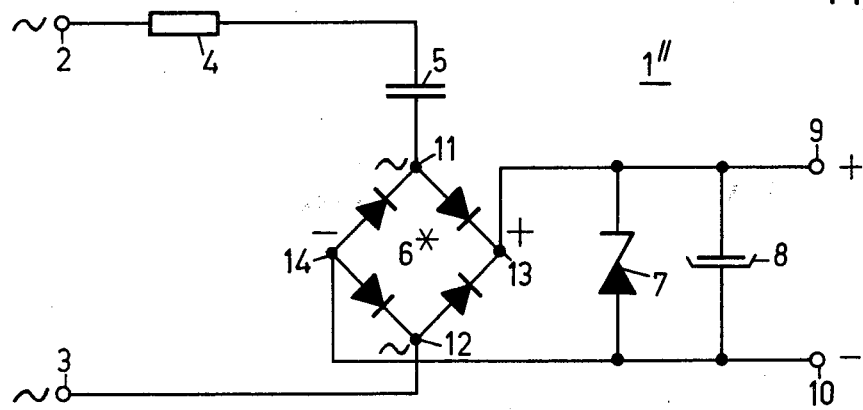
FIG. 3 illustrates a third embodiment with a bridge-connected full-wave rectifier and a voltage limiter connected in parallel with the direct-current terminals of the bridge rectifier and FIG. 4 illustrates a fourth embodiment, similar to the arrangement of FIG. 3, but using an inductive protective impedance.

FIG. 3 shows a current supply arrangement 1'' which, like the embodiment illustrated in FIG. 2, embodies a series circuit comprising a protective impedance 4, a capacitor 5 and a full-wave rectifier 6* in the form of a bridge rectifier. In this case, however, the voltage limiter 7 is connected in parallel with the direct-current terminals 13 and 14 of the full-wave rectifier 6*. The storage capacitor 8 and the output terminals 9 and 10 are also connected to the same direct-current terminals.

One feature common to all four embodiments is that the capacitive voltage drop across the capacitor 5 is almost exclusively used for reducing the voltage from, for example, 220 volts mains a.c. voltage to, for example, 10 to 30 volts alternating-current voltage at the alternating-current terminals of the full-wave rectifier. The voltage drop across the protective impedance 4 can be virtually ignored. Accordingly, the capacitor 5 must be dimensioned for almost the entire mains a.c. voltage. The use of this capacitor 5 provides for a virtually loss-free voltage reduction.

Figure 4:
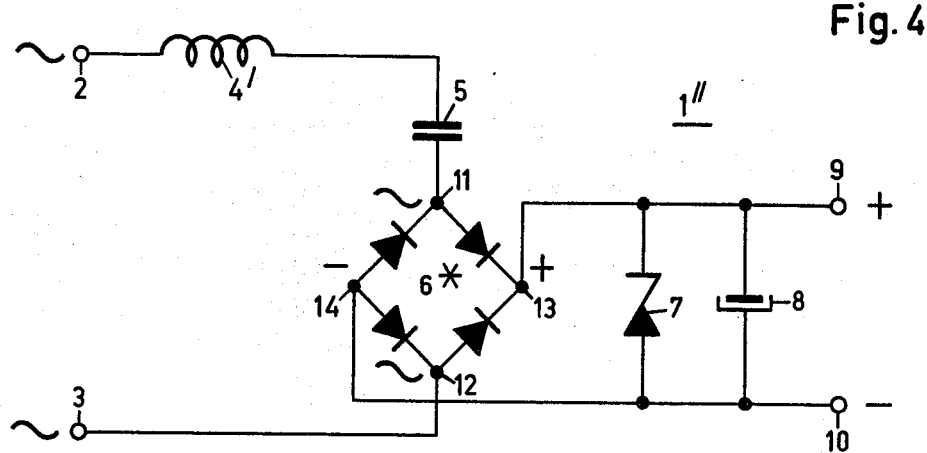

The protective impedance 4 assumes the protection of the circuit arrangement against surge voltages of the kind which are known to occur in alternating-current mains due to atmospheric discharges. A resistance or an inductance, or a series connection of a resistance and an inductance, can be used as the protective impedance 4. In the arrangement of FIG. 4 which essentially corresponds to that of FIG. 3, there is used an inductance 4' as the protective impedance. The protective impedance must of course be capable of withstanding the above mentioned surge voltages. The resistance of electrical components and equipment to surge voltages is normally tested with standardized surge voltages. In tests of this kind, the voltage increases to several kilovolts within 1 μs and, thereafter, decays exponentially to 50% in 50 μs. In the absence of the protective impedance 4, a transient or surge current of several kiloamps would flow through the series circuit consisting of the capacitor 5, full-wave rectifier 6 and filter capacitor 8, which would result in destruction of these components and even of the connecting lines.

With a protective impedance of about 1,000 ohms or 10 . . . . . 50 mH, this transient current is reduced to a few amps, which is acceptable in view of its short duration.

In view of the low-pass character of the series circuit consisting of the protective impedance 4, capacitor 5, full-wave rectifier 6 and filter capacitor 8, most of the surge voltage is applied across the protective impedance 4 so that the remaining circuit elements are protected. The impedance 4 may be, for example, a CML 828 type resistor manufactured by Amherd Corporation, Zurich, Switzerland.

By way of example, a capacitance of about 1 μF may be selected for the capacitor 5 in a current supply arrangement for 20 volts and 0.5 watt for a mains voltage of 220 volts. A value of about 1000 ohms is preferably selected for the ohmic resistance of the protective impedance 4. If a protective impedance of inductive character is selected (see FIG. 4), an inductance of around 10 to 50 mH is suitable for example for a current-supply arrangement of the aforementioned kind.

A current supply arrangement designed in this way with a surge voltage proof resistance costs about 50% less to build than a transformer-equipped current-supply arrangement of the same output.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A current supply arrangement for an electronic remote control receiver having a selective receiving section which filters out pulse sequences of a given characteristic from voltage signals delivered to its input, comprising a transformer-free series circuit connected between two input terminals intended for direct, conductive connection to alternating-current voltage supply mains, said series circuit including a protective impedance for protecting the circuit arrangement against surge voltages of the kind known to occur in alternating-current mains, a capacitor for substantially loss-free voltage reduction of voltage from the voltage supply and a full-wave rectifier, and a voltage limiter for voltage stabilization in circuit with said full-wave rectifier.

2. The arrangement as defined in claim 1, wherein said full-wave rectifier is connected in parallel with a Zener diode, said Zener diode comprising said voltage limiter.

3. The arrangement as defined in claim 1, wherein said full-wave rectifier is a bridge rectifier having aternating-current input terminals, and wherein said voltage limiter comprises a series combination of two Zener diodes connected across said alternating-current input terminals of said bridge rectifier.

4. The arrangement as defined in claim 1, wherein said full-wave rectifier is a bridge rectifier having direct-current output terminals, and wherein said voltage limiter comprises a Zener diode connected in parallel with said direct-current output terminals.

5. The arrangement as defined in claim 1, wherein said protective impedance comprises a surge voltage proof resistance.

6. The arrangement as defined in claim 1, wherein said protective impedance comprises an impedance of inductive character and is resistant to surge voltages.

* * * * *